Patented Jan. 16, 1951

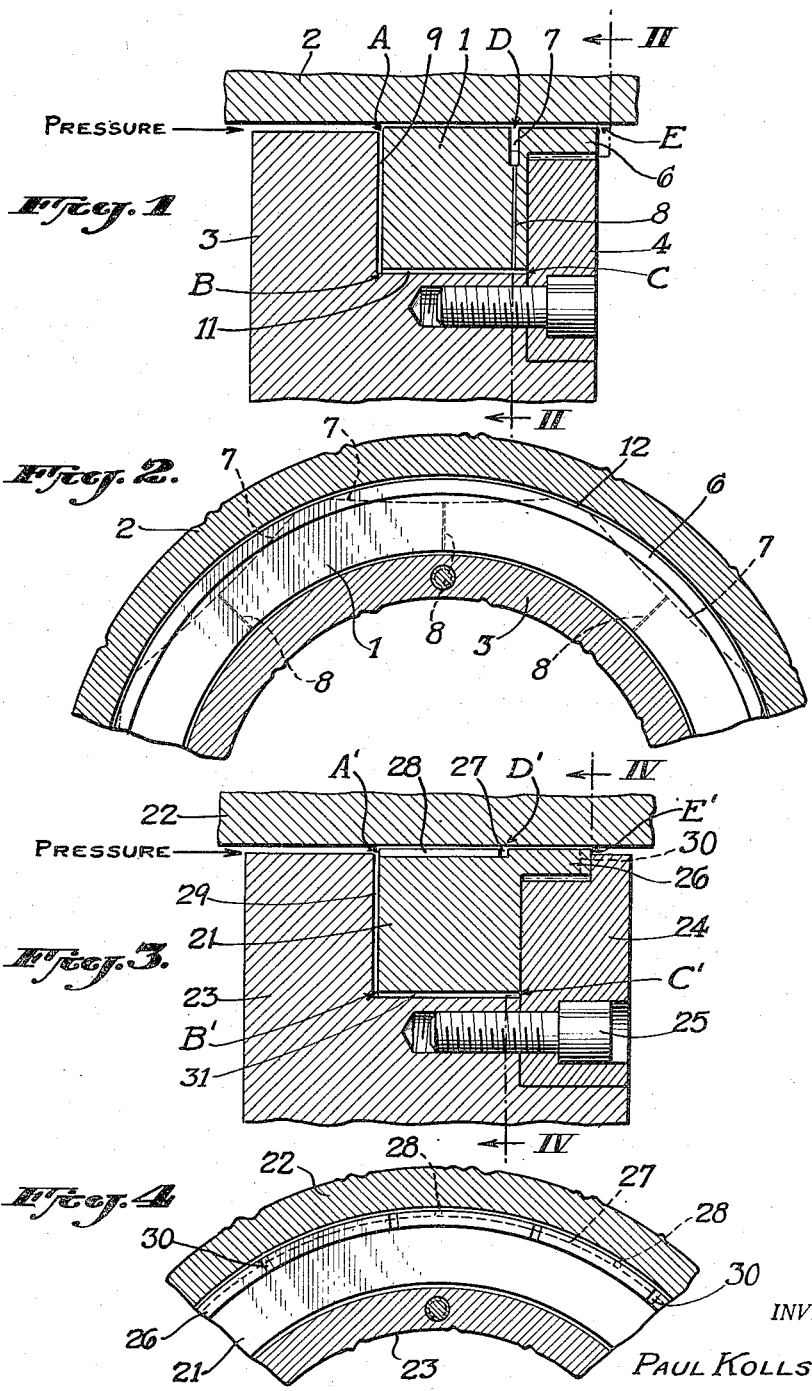

2,538,422

UNITED STATES PATENT OFFICE 2,538,422

FLUID SEAL

Paul Kollsman, New York, N. Y.

Application February 21, 1945, Serial No. 578,981

5 Claims. (Cl. 286—26)

This invention relates to means providing a fluid seal between relatively movable surfaces and has for its primary object the provision of an effective seal with a minimum of frictional resistance to relative movement between the surfaces.

Another object of the invention is the provision of a sealing means automatically self-regulated throughout its various sections to determine its pressure with relation to the cooperating surface.

Other objects and features of the invention will be readily apparent to those skilled in the art from the specification and appended drawings illustrating certain preferred embodiments in which:

Figure 1 is a longitudinal sectional view through the seal according to the present invention.

Figure 2 is a partial transverse sectional view on the line II—II of Figure 1.

Figure 3 is a partial longitudinal sectional view similar to Figure 1 but showing a modified form of the invention.

Figure 4 is a partial transverse sectional view on the line IV—IV of Figure 3.

As specifically illustrated in the drawing, the seal, according to the present invention, is embodied in an annulus or ring providing a fluid seal between two cylindrical surfaces relatively movable either rotatably or reciprocally. It is, of course, to be understood that the seal may be embodied in other structural shapes and that it may be straight or of irregular conformation and the term "ring" as used in the specification and claims is to be construed as including such straight or irregular structural shapes as well as the annular form. Also, while the seal has been shown in the exterior periphery of the ring, it will be understood that it will function equally as well on a side thrust surface.

The modification shown in Figures 1 and 2 discloses an annular ring 1 providing a fluid seal between the cylindrical surface on the member 2 and the cylindrical surface on the member 3, the members 2 and 3 being relatively movable either in rotation or reciprocation. The ring 1 may be a conventional split ring or may have an inherent resiliency permitting the minor movement required for its self-adjustment as hereinafter explained. The ring 1 is disposed within an annular rabbet in the member 3 and is maintained in place by the annular plate 4 secured to the member 3 by a plurality of studs 5. The outer surface of the ring 1 adjacent the cylindrical surface of the member 2 is elongated to form an annular extension 6. Within the outer periphery of the ring at the point D there are disposed a plurality of narrow chambers 7 communicating with the interior surface of the ring through capillary openings 8. The annular rabbet within the member 3 is of such size as to provide a clearance 9 at the side of the ring 1 and a clearance 11 at the inner surface of the ring 1, the clearances 9 and 11 being larger than capillary and thus larger than the opening 8 so as to provide for the free flow of fluid therethrough. The sections of the outer periphery of the ring 1 between the cutout chambers 7, as indicated at 12, serve to prevent ready communication between the chambers and hence isolate them with respect to the individual pressures therein.

For a description of the operation of the seal according to the invention the points A, B, C, D and E have been indicated on Figure 1. The full pressure which the seal is to hold will, of course, be present at the point A. Hence, since the openings 9 and 11 are larger than capillary, the full operating pressure will also be within clearance 11 and acting upon the surface BC. With the ring in tight sealing relation with the surface of member 2, the high pressure fluid will flow through the capillary or restricted passage 8 and the point D will also be at substantially full operating pressure so that the full operating pressure will also act upon the surface of the ring from points A to D. From D to E the pressure changes from full operating to exterior pressure and hence upon the surface of the ring DE a mean pressure therebetween will be operating. Under the condition described, the resultant force acting on the ring will tend to move it a short distance away from the surface of the member 2 since the force acting on the surface BC of the ring will be neutralized by the full pressure acting upon the surface AD plus a portion of the mean force acting on the surface DE. The excess force resulting from the pressure on that portion of the surface DE which is not necessary to neutralize the force from the pressure acting on the surface BC will thus tend to move the ring away from the cooperating surface. If, on the other hand, the ring or a section thereof should move too far from the surface of member 2, the fluid will flow from point D to point E faster than it can be supplied from the passage 8, so that the pressure upon the outer surface of the ring between points A and D is no longer the full operating pressure over the entire surface but decreases progressively in accordance with the clearance between the ring and the member 2. The mean pressure acting on the surface AE then results in a force less than that resulting from the full operating pressure on the surface BC so that the ring moves into more intimate contact with the member 2. From this it will be seen that a self-regulating action exists in which the ring seeks to maintain throughout its various sections a distance with respect to the cooperating surface of member 2 at which the forces acting on the surfaces AE and BC and any resilient forces in the ring itself are neutralized. By this means an effective seal between the surface of members 2 and 3 is provided with a minimum of friction between the ring 1 and the member 2 resulting in a minimum of resistance to relative movement between the members and a minimum of wear. Since the chambers 7 about the ring are substantially out of communication with each other in view of the portions 12, the self-regulating action above described will take place throughout the various sections of the ring in response to the local clearances and pressures thereat.

In the modification shown in Figures 3 and 4 a seal is provided by a ring 21 between the surfaces of members 22 and 23. The ring 21 is situated in an annular rabbet in the member 23 and is held in place by an annular plate 24 secured to the member 23 by a plurality of studs 25. The outer portion of the ring 21 is provided with an annular projection at 26. Annular projection 26 is provided with a plurality of radial grooves 30 constituting vent openings. The outer periphery of the ring is provided with a continuous groove or notch 27 which is capillary in size and a plurality of circumferentially spaced capillary notches 28 communicate therewith from a high pressure side of the ring. The clearances 29 and 31 at the side and inner surface of the ring are of a size larger than capillary.

The self-regulating action of the seal shown in Figures 3 and 4 is substantially the same as that described in connection with the preferred form of the invention shown in Figures 1 and 2. If the clearance between the ring and the cooperating surface is too small, the resultant force across the surface A'E' will be greater than the force resulting from the full operating pressure on the surface B'C', since under this condition the full operating pressure will be acting upon the surface A'D' and a mean pressure upon the additional surface D'E' with the force resulting over the entire surface A'E' being greater than the force on the inner surface of the ring so that the ring tends to move away from its cooperating surface. On the other hand, if the clearance between the ring and its operating surface is too great, an appreciable fluid flow takes place from point D' toward the point E' faster than the fluid can be supplied through passages 28 so that the force acting upon the surface A'D' is now substantially less than the full operating pressure and the force resulting from the mean pressure on the surface A'E' will be less than the force exerted by the full operating pressure on the surface B'C', so that the ring will tend to move into closer cooperation with the surface of member 2. Since the groove or notch 27 is capillary in size, the ring will again perform its self-regulation by individual sections according to the local conditions existing since in view of the capillary size of the groove the pressure throughout the groove will not become equalized.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a fluid seal for relatively movable members, a flexible sealing ring associated with one of the said members and having a peripheral working surface cooperating with the surface on the other of said members, a plurality of individual chambers in the peripheral working surface of the ring, capillary passages leading from the pressure against which the ring is to seal to said chambers, and means larger than said capillary passages placing the surface of said ring opposite to its working surface in communication with said pressure whereby the local resultant force to extend or contract the ring will be a function of the local spacing of the working surface of the ring from the surface of said other member, said opposite ring surface having a lesser area than the area of its working surface.

2. In a fluid seal for relatively movable members, a flexible sealing ring associated with one of the said members and having a peripheral working surface cooperating with the surface on the other of said members, a plurality of individual chambers in the peripheral working surface of the ring, capillary passages leading from the pressure against which the ring is to seal to said chambers, means larger than said capillary passages placing the surface of said ring opposite to its working surface in communication with said pressure whereby the local resultant force to extend or contract the ring will be a function of the local spacing of the working surface of the ring from the surface of said other member, said working surface having a greater area than the surface opposite thereto and said chambers being remote from the high pressure edge of the ring.

3. In a fluid seal for members movable relatively to each other, a flexible sealing ring associated with one of said members, said ring having a peripheral working surface cooperating with the surface of the other member to effect the seal the working surface of said ring being larger in area than the surface of the ring opposite the working surface, means forming a passage extending from the high pressure side for applying to the surface of said ring opposite the working surface the full pressure against which the ring is to seal, said ring having a peripheral surface groove in the working surface and having further a plurality of surface grooves in the working surface leading from the high pressure side to said peripheral groove, said grooves being of capillary character and offering a resistance to flow greater than the flow resistance of said passage forming means, whereby the forces acting on the working surface, and on said opposite surface of said ring tending to loosen and tighten, respectively, the engagement between said working surface and the surface of said other member, effect self-regulation of the spacing between said sealing surface and the surface of said other member.

4. In a fluid seal for members movable relatively to each other, a flexible sealing ring associated with one of said members, said ring having a peripheral working surface cooperating with the surface of the other member to effect the seal, the working surface of said ring being larger in area than the surface of the ring opposite the working surface, means forming a passage extending from the high pressure side for applying to said opposite surface the full pressure against which the ring is to seal, said ring having a capillary groove in the working surface of the ring spaced from the high pressure edge thereof, and a plurality of restricted passages in said ring leading from the high pressure side to said groove said restricted passages offering a resistance to fluid flow greater than the resistance of said passage forming means, whereby the forces acting on the working surface, and on said opposite surface of said ring tending to loosen and tighten, respectively, the engagement between said working surface and the surface of said other member, effect self-regulation of the spacing between said sealing surface and the surface of said other member.

5. In a fluid seal for relatively movable members between which the seal is effective, a flexible sealing ring carried by one of said relatively movable members, said sealing member having a peripheral working surface cooperating with the surface of the other relatively movable member to provide the seal, the working surface of said ring being larger in area than the surface of the ring opposite the working surface, means forming a passage extending from the high pressure side for applying to the surface of said sealing member opposite to its working surface the full pressure against which the seal operates, and a plurality of restricted passages offering a resistance to fluid flow greater than the resistance of said passage forming means, said passages leading from the high pressure side to points on said working surface, said points being spaced from the high pressure edge of the working surface, and communication between said points on the working surface being restricted, whereby the force with which the sealing member bears with its working surface against the surface of the other of said relatively movable members, and the spacing of the working surface with respect to the surface of said other member, are locally self-controlled.

PAUL KOLLSMAN.

REFERENCES CITED

The following references are of record in the file of this patent:

UNITED STATES PATENTS

| Number | Name | Date |
|---|---|---|
| 1,334,393 | Parsons et al. | Mar. 23, 1920 |
| 1,689,874 | Jabs | Oct. 30, 1928 |
| 1,779,076 | Ray | Oct. 21, 1930 |
| 1,825,251 | Schellens | Sept. 29, 1931 |
| 1,999,094 | Godron | Apr. 23, 1935 |
| 2,048,633 | Eweis | July 21, 1936 |

FOREIGN PATENTS

| Number | Country | Date |
|---|---|---|
| 524,515 | Germany | of 1931 |